US007346697B2

(12) United States Patent
Zhang et al.

(10) Patent No.: US 7,346,697 B2
(45) Date of Patent: *Mar. 18, 2008

(54) MULTIPLE-LEVEL INTERNET PROTOCOL ACCOUNTING

(75) Inventors: Shujin Zhang, San Mateo, CA (US); Shuxian Lou, San Jose, CA (US); Roman Peter Kochan, Irvine, CA (US); Aravind Sitaraman, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 10/936,006

(22) Filed: Sep. 7, 2004

(65) Prior Publication Data

US 2005/0044216 A1    Feb. 24, 2005

Related U.S. Application Data

(60) Division of application No. 09/589,609, filed on Jun. 7, 2000, now Pat. No. 6,792,457, which is a continuation of application No. 09/172,183, filed on Oct. 13, 1998, now Pat. No. 6,119,160.

(51) Int. Cl.
*G06F 15/16* (2006.01)
*G06F 11/00* (2006.01)

(52) U.S. Cl. .................. 709/230; 709/226; 709/227
(58) Field of Classification Search ........ 709/224–225, 709/227–229, 226, 230
See application file for complete search history.

(56) References Cited

U.S. PATENT DOCUMENTS

| 5,241,594 A | 8/1993 | Kung .......................... 380/4 |
| 5,283,783 A | 2/1994 | Nguyen et al. ............. 370/16.1 |
| 5,287,103 A | 2/1994 | Kasprzyk et al. ...... 340/825.52 |
| 5,408,469 A | 4/1995 | Opher et al. ............... 370/60.1 |
| 5,519,704 A | 5/1996 | Farinacci et al. ........ 370/85.13 |

(Continued)

FOREIGN PATENT DOCUMENTS

WO    99/53408    10/1999

OTHER PUBLICATIONS

D. Carrel et al., "The TACACS+ Protocol" ver. 1.78, Network Working Group Internet Draft, Jan. 1997, pp. 1-40, http://www.tacplus.org/downloads/tac-rfc.1.78.txt.

(Continued)

*Primary Examiner*—Patrice L Winder
(74) *Attorney, Agent, or Firm*—Thelen Reid Brown Raysman & Steiner LLP

(57) ABSTRACT

A method and apparatus for providing computer network access points the capability for multiple-level accounting. A gateway device located at the access point is capable of generating Internet protocol accounting start and stop requests based on various events that need to be accounted for when a user accesses a network. These events include the user account logon, the service establishments and the Point to Point protocol (PPP) connections between the gateway device and public and private domains within the network. The counter is capable of tracking the duration of sessions and connections and the byte-count associated with the specified session or connection. The gateway device communicates with an accounting server which stores the accounting requests and matches start requests with subsequent stop requests.

79 Claims, 4 Drawing Sheets

U.S. PATENT DOCUMENTS

| | | | | |
|---|---|---|---|---|
| 5,555,244 | A | 9/1996 | Gupta et al. | 370/60.1 |
| 5,592,470 | A | 1/1997 | Rudrapatna et al. | 370/320 |
| 5,621,721 | A | 4/1997 | Vatuone | 370/16 |
| 5,655,077 | A | 8/1997 | Jones et al. | 395/187.01 |
| 5,668,857 | A | 9/1997 | McHale | 379/93.07 |
| 5,671,354 | A | 9/1997 | Ito et al. | 395/187.01 |
| 5,673,265 | A | 9/1997 | Gupta et al. | 370/432 |
| 5,678,006 | A | 10/1997 | Valizadeh et al. | 395/200.02 |
| 5,682,482 | A | 10/1997 | Burt et al. | |
| 5,684,950 | A | 11/1997 | Dare et al. | 395/187.01 |
| 5,715,394 | A | 2/1998 | Jabs | 395/200.11 |
| 5,717,604 | A | 2/1998 | Wiggins | 364/514 C |
| 5,729,546 | A | 3/1998 | Gupta et al. | 370/434 |
| 5,740,176 | A | 4/1998 | Gupta et al. | 370/440 |
| 5,745,556 | A | 4/1998 | Ronen | 379/127 |
| 5,761,507 | A | 6/1998 | Govett | |
| 5,768,521 | A | 6/1998 | Dedrick | 395/200.54 |
| 5,778,182 | A | 7/1998 | Cathey et al. | 395/200.49 |
| 5,787,253 | A | 7/1998 | McCreery et al. | 395/200.61 |
| 5,799,017 | A | 8/1998 | Gupta et al. | 370/419 |
| 5,812,529 | A | 9/1998 | Czarnik et al. | 370/245 |
| 5,815,665 | A | 9/1998 | Teper et al. | 395/200.59 |
| 5,852,812 | A | 12/1998 | Reeder | 705/39 |
| 5,870,550 | A | 2/1999 | Wesinger, Jr. et al. | |
| 5,898,780 | A | 4/1999 | Liu et al. | 380/25 |
| 5,905,736 | A | 5/1999 | Ronen et al. | 370/546 |
| 5,913,037 | A | 6/1999 | Spofford et al. | 395/200.56 |
| 5,918,016 | A | 6/1999 | Brewer et al. | 395/200.5 |
| 5,922,051 | A | 7/1999 | Sidey | 709/223 |
| 5,933,625 | A | 8/1999 | Sugiyama | 395/557 |
| 5,944,824 | A | 8/1999 | He | 713/201 |
| 5,960,409 | A | 9/1999 | Wexler | 705/14 |
| 5,968,116 | A | 10/1999 | Day, II et al. | 709/202 |
| 5,970,477 | A | 10/1999 | Roden | 705/32 |
| 5,974,463 | A | 10/1999 | Warrier et al. | |
| 5,987,430 | A | 11/1999 | Van Horne et al. | |
| 5,991,810 | A | 11/1999 | Shapiro et al. | 709/229 |
| 5,991,828 | A | 11/1999 | Horie et al. | 710/8 |
| 6,009,103 | A | 12/1999 | Woundy | 370/401 |
| 6,011,910 | A | 1/2000 | Chau et al. | 395/200.59 |
| 6,018,619 | A | 1/2000 | Allard et al. | 395/200.54 |
| 6,018,770 | A | 1/2000 | Little et al. | 709/223 |
| 6,021,429 | A | 2/2000 | Danknick | 709/208 |
| 6,021,496 | A | 2/2000 | Dutcher et al. | 713/202 |
| 6,026,440 | A | 2/2000 | Shrader et al. | 709/224 |
| 6,026,441 | A | 2/2000 | Ronen | 709/227 |
| 6,035,281 | A | 3/2000 | Crosskey et al. | 705/14 |
| 6,035,404 | A * | 3/2000 | Zhao | 709/225 |
| 6,047,376 | A | 4/2000 | Hosoe | 713/201 |
| 6,052,730 | A | 4/2000 | Felciano et al. | 709/225 |
| 6,091,951 | A | 7/2000 | Sturniolo et al. | 455/432 |
| 6,092,196 | A | 7/2000 | Reiche | 713/200 |
| 6,104,704 | A | 8/2000 | Buhler et al. | |
| 6,119,160 | A | 9/2000 | Zhang et al. | 709/224 |
| 6,141,687 | A | 10/2000 | Blair | 709/225 |
| 6,151,628 | A * | 11/2000 | Xu et al. | 709/225 |
| 6,205,479 | B1 * | 3/2001 | Dulai et al. | 709/225 |
| 6,219,790 | B1 | 4/2001 | Lloyd et al. | |
| 6,282,575 | B1 | 8/2001 | Lin et al. | |
| 6,442,588 | B1 * | 8/2002 | Clark et al. | 709/246 |
| 6,792,457 | B1 * | 9/2004 | Zhang et al. | 709/227 |
| 2002/0002688 | A1 | 1/2002 | Gregg et al. | |

OTHER PUBLICATIONS

"Active Software's Integration System", Active Software, Inc., printed from http://www.activesw.com/products/products.html, on Jul. 24, 1998.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

Cisco Systems, Inc., "Cisco DNS/DHCP Manager V.1.1", printed from http://www.combinet.com/warp/public/751/dnsmg/dnsmg_ds.htm, on Sep. 10, 1998, 4 pages.

Cisco Systems, Inc., "Cisco DNS/DHCP Manager V.1.1", printed fromhttp://www.combinet.com/warp/public/751/dnsmg/dnsmg_pa.htm, on Sep. 10, 1998, 7 pages.

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Edell, et al., "Billing Users and Pricing for TCP", 1995 IEEE, IEEE Journal on Selected Areas in Communications, pp. 1-14.

"Hot Products & Solutions", Network Registrar, American Internet Corporation, printed from http://www.american.com/networkregistrar, html, on Jul. 24, 1998.

"Hot Products & Solutions—IP Address Management: A White Paper", Network Registrar, American Internet Corporation, Bedford, MA, printed from http://www.american.com/ip-mgmt.html, on Jul. 24, 1998.

"Regain Confidence and Control Over Your IP Address Infrastructure", Network Registrar, American Internet Corporation, Bedford, MA.

"Three Ways to Manage IP Addresses", PC Magazine: IP Address Management, printed from http://www.zdnet.com/pcmag/features/ipmanage/ip-s2.htm, on Sep. 10, 1998.

RADIUS Accounting, Livingston Enterprises, Ltd., http://docs.daphnis.com/portmaster/RADIUS/guide/7account, 7 pages, Jan. 1996.

Christopher King, Web-Access Authentication Using RADIUS: An Intermediate method for secure exchanges on the Web, Web Techniques, 7 pages (Aug. 1996).

Carl Rigney et al., RFC 2138 Remote Authentication Dial In User Service (RADIUS), RFC editor, Internet Society (Apr. 1997).

Carl Rigney, RFC2139 RADIUS Accounting, RFC editor, Internet Society (Apr. 1997).

Edell, et al., "Billing Users and Pricing for TCP", 1995 IEEE, IEEE Journal on Selected Areas in Communications, Sep. 1995, pp. 1162-1175.

"Hot Products & Solutions", Network Registrar, American Internet Corporation, printed from http://www.american.com/networkregistrar,html, on Jul. 24, 1998.

"Hot Products & Solutions - IP Address Management: A White Paper", Network Registrar, American Internet Corporation, Bedford, MA, printed from http://www.american.com/ip-mgmt.html, on Jul. 24, 1998.

"Regain Confidence and Control Over Your IP Address Infrastructure", Network Registrar, American Internet Corporation, Bedford, MA., Jan. 1998.

"Three Ways to Manage IP Addresses", PC Magazine: IP Address Management, printed from http://www.zdnet.com/pcmag/features/ipmanage/ip-s2.htm, on Sep. 10, 1998.

* cited by examiner

MULTIPLE-LEVEL INTERNET PROTOCOL ACCOUNTING

CROSS REFERENCE TO RELATED APPLICATIONS OR PRIORITY CLAIM

This application is a divisional of U.S. patent application Ser. No. 09/589,609, entitled "Multiple-Level Internet Protocol Accounting," filed on Jun. 7, 2000, now U.S. Pat. No. 6,792,457, issued Sep. 14, 2004, which is a continuation of U.S. patent application Ser. No. 09/172,183, entitled "Multiple-Level Internet Protocol Accounting," filed on Oct. 13, 1998, now U.S. Pat. No. 6,119,160 issued Sep. 12, 2000, all of which are in the names of the same inventors and assigned to the same assignee.

BACKGROUND OF THE INVENTION

1. Field of the Invention

The present invention relates to an accounting method and apparatus used in a computer network. More particularly, the present invention relates to a method and apparatus for generating time-based and/or byte-based accounting for various significant start/stop events using standard Internet protocol, such as the Remote Authentication Dial-In User Service (RADIUS) protocol.

2. Background

The ability to provide computer networking capabilities to the home personal computer (PC) is typically provided by telephone companies (Telcos) or commercial Internet Service Providers (ISPs) who operate network access points along the information superhighway. Network access points which are commonly referred to as Points of Presence or PoPs are located within wide area networks (WAN) and serve to house the network interfaces and service components necessary to provide routing, bridging and other essential networking functions. It is through these network access points that the user is able to connect with public domains, such as the Internet and private domains, such as the user's employer's intra-net.

Currently, Telcos and ISPs are limited in the means by which they can charge customers for their product Basically, Telcos and ISPs are confined to either charging a flat fee, typically on a monthly basis, thus allowing the user united network access for the specified period, or charging the user on a rate basis, typically an hourly rate. These billing schemes are primitive because the current capabilities possessed by the Telcos and ISPs provide only a simplified means of accounting for the events which a user undertakes during the time the user is logged on to the access point. Current technology only allows for the Telco or ISP to account for the duration of the period from when a user logs-on to the Telco or ISP and when the user subsequently logs-off.

As an example, a user implements a "dashboard" application on their host/computer which requires them to input identification and authorization information. This information is then sent via modem and telephone line to the Telco or ISP operated access point. A network access server (NAS) receives the identification and authorization information and proxies it to an authentication, authorization and accounting server. Once the server verifies the user authentication and authorization it grants the user logon access to downstream public and private networks. At this point a counter within the NAS is engaged which begins tracking the duration of the log-on session as well as the byte count encountered during the session. Subsequently, when the user desires to log off or a log off is warranted by other means outside of the control of the user, the counter within the NAS is disengaged and the appropriate accounting data is forwarded to the accounting server.

The Telco or ISP would benefit from having a more developed accounting scheme which allows for the tracking of various major events which occur during the life of the logon session. For example, through the Telco or ISP the user is capable of connecting with various services (e.g. the Internet, private intra nets, private pay-for-access domains). Additionally, once the user has initialized or connected to the service, the individual. PPP connections and PPP disconnections in to and out of the service can be accounted for. Such multiple-level accounting would provide the Telco or ISP with flexibility in devising sophisticated rate schemes. The ISPs and Telcos would no longer be restricted by rate schemes solely based on account logon and account logoff, but rather customers could be charged in accordance to the specific services which they access and the duration, byte-count or quantity of the connections to those service. The ability to account for service establishment and PPP connections allows Telcos and ISPs to offer their customers (i.e. computer users) cost effective access to communities of interest (i.e. those domains sites which are designated as pay-per-use.) Telcos and ISPs would be afforded the capability to provide detailed billing information and create various service options.

BRIEF DESCRIPTION OF THE INVENTION

The present invention is a method and apparatus for providing computer network access points the capability for multiple-level accounting. A gateway device located at the access point is capable of generating Internet protocol accounting start and stop requests based on various events that are to be accounted for when a user accesses a network. These events include the user account logon, the service establishments and the Point to Point protocol (PPP) connections between the gateway device and public and private domains within the network. The counter is capable of tracking the duration of sessions and connections and the byte-count associated with the specified session or connection. The gateway device communicates with an accounting server which stores the accounting requests and matches start requests with subsequent stop requests.

OBJECTS AND ADVANTAGES OF THE INVENTION

Accordingly, it is an object and advantage of the present invention to provide a method for network access point maintainers to implement multiple-level accounting which thereby provides the capability for detailed billing records and create various service options.

Another object and advantage of the present invention is to provide for a accounting system within a PoP of a computer network which is capable of multiple-level accounting.

Another object and advantage of the present invention is to provide a computer network service provider the capability to account for account logons, service establishments and PPP connections.

Another object and advantage of the present invention is to provide a secured means for providing multiple-level accounting by implementing means for retrying accounting requests and providing for secondary hardware back-up.

Yet another object and advantage of the present invention is to allow for the accounting request packets to use eight byte integers thus operating at 1.5 meg bits/second and eliminating the concern over counter overflow.

These and many other objects and advantages of the present invention will become apparent to those of ordinary skill in the art from a consideration of the drawings and ensuing description.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

The present invention allows the computer network service provider to assemble accounting records for three separate accounting events. These events are the initial network account logon/logoff, the service establishment/termination and the individual connection starts and stops to a specified service. The present invention is capable of accounting for both the time duration for an event and for the byte count encountered during a given event.

Figure 1:
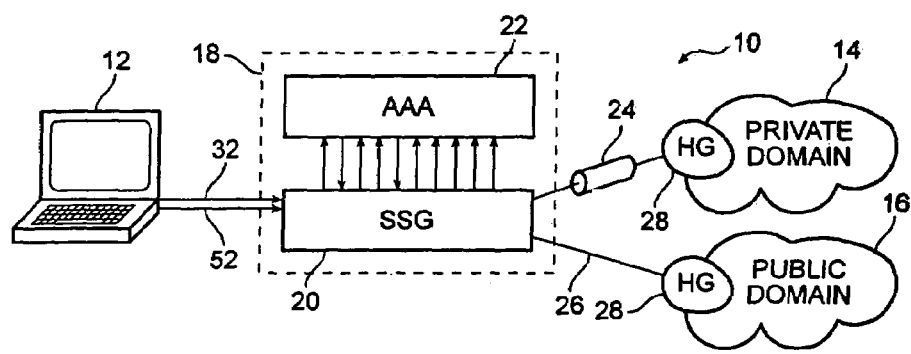
FIG. 1 is a schematic drawing of a computer network embodying a method for multiple-level Internet protocol accounting in accordance with a presently preferred embodiment of the present invention.
Figure 2A:
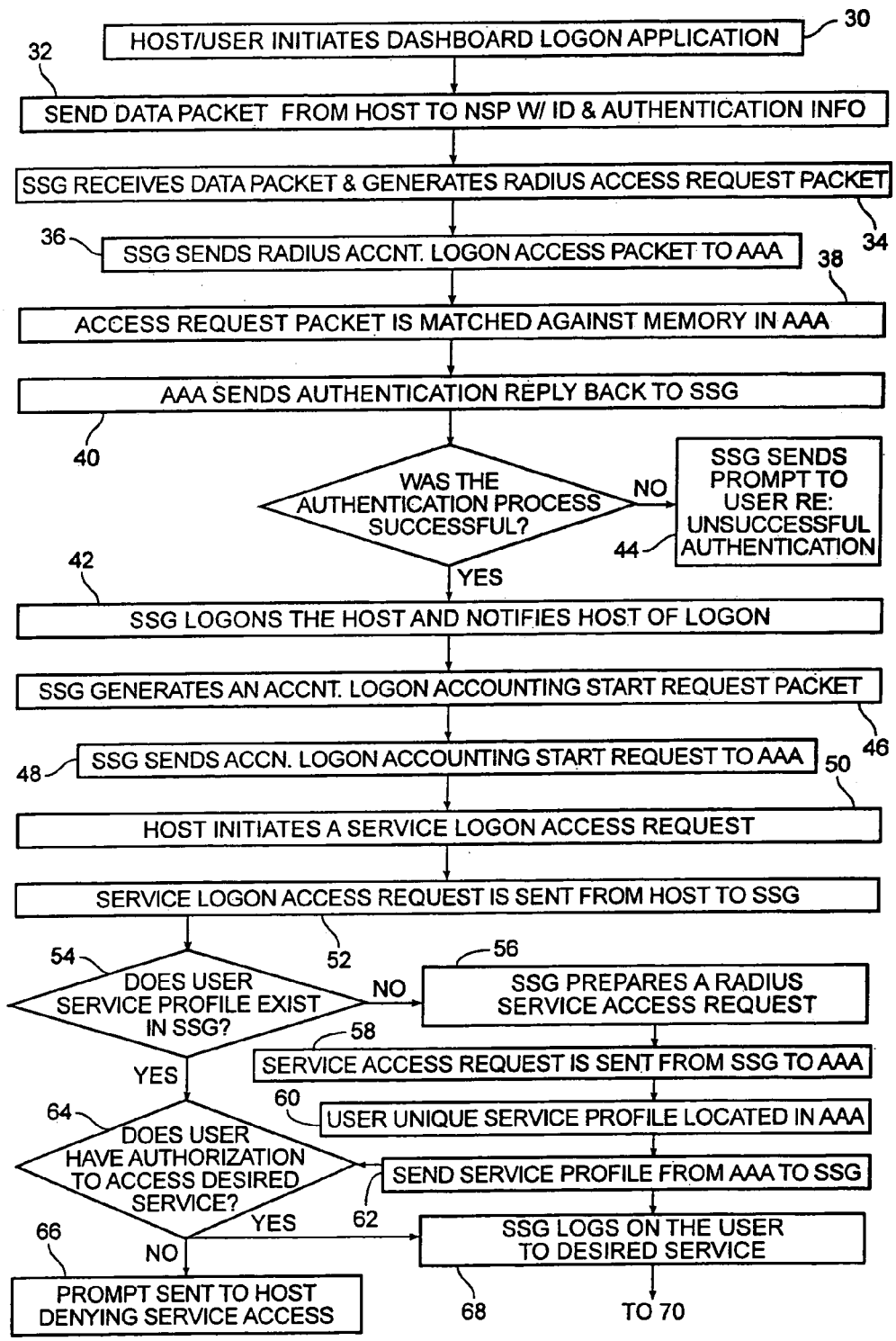
FIGS. 2A and 2B are a flow diagram of a method for multiple-level Internet protocol accounting in a computer network in accordance with a presently preferred embodiment of the present invention.
Figure 2B:
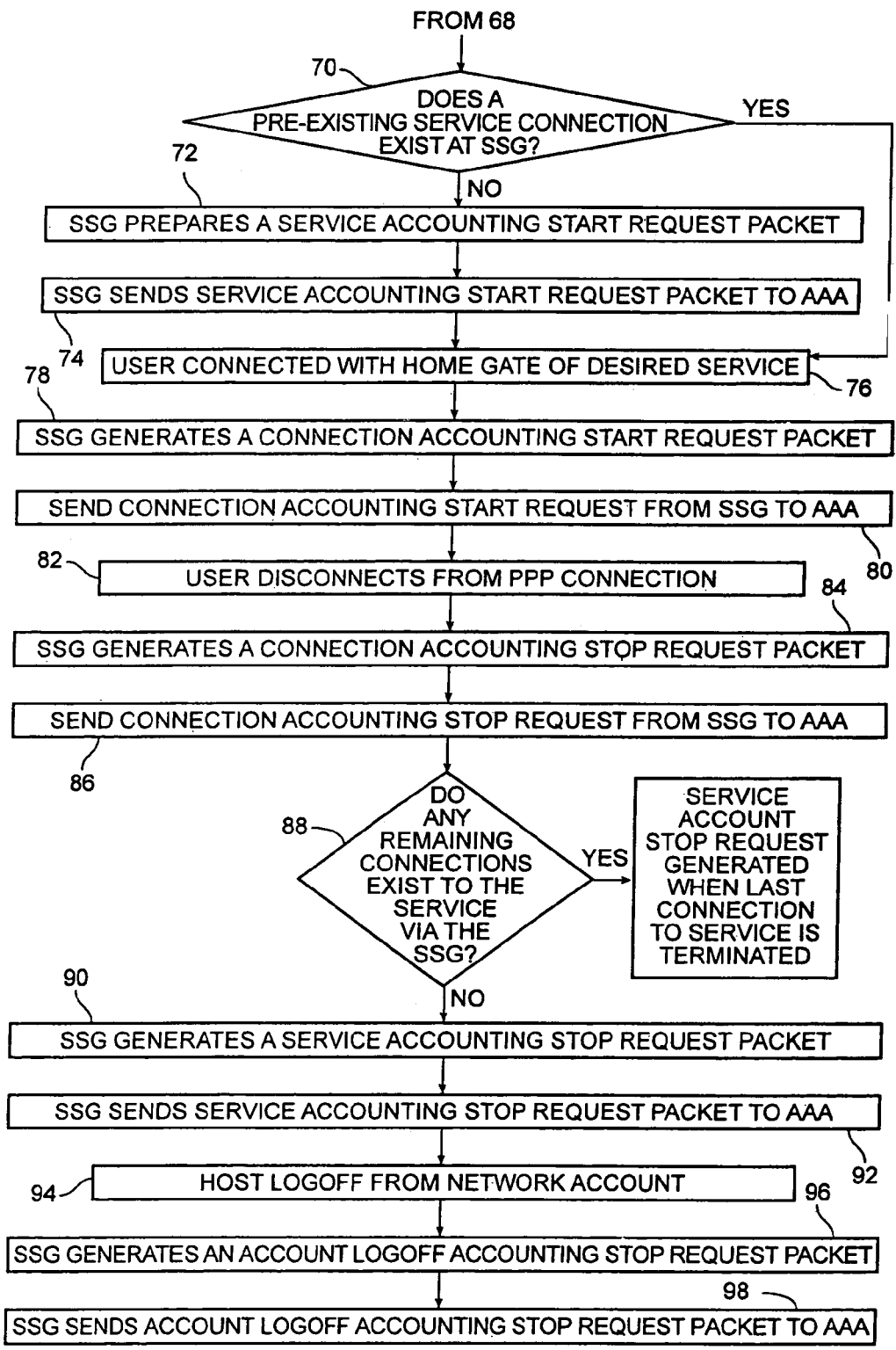

In a presently preferred embodiment of the present invention, a method for multiple-level internet protocol accounting is illustrated by the computer network schematic of FIG. 1 and the flow diagrams of FIGS. 2A and 2B. In the simplified schematic of a computer network 10 shown in FIG. 1, the host 12 is able to connect with various private and public network domains 14 and 16, including the internet through an access point 18. The access point 18 is typically a computer network service provider, such as a telephone company (Telco) or commercial internet service provider (ISP). The access point serves as a link in the overall network scheme and houses various network interfaces and service components capable of routing and transferring data to and from various points on the network. Shown in FIG. 1 are a service selection gateway (SSG) 20, such as the Cisco model 6510, manufactured by Cisco Systems, Inc. of San Jose, Calif. and an authentication, authorization and accounting (AAA) server 22, such as Cisco ACS or Cisco Secure, manufactured by Cisco Systems, Inc. of San Jose, Calif. These devices are located within the access point 18 and are instrumental in carrying out the multiple-level internet protocol accounting method of this presently preferred embodiment The AAA server 22 may accommodate several client SSG's simultaneously and communicate with one another according to a standard Internet protocol. For the presently preferred embodiment of this invention, the Remote Authentication Dial-In User Service (RADIUS) protocol is used as the communication protocol between the SSG 20 and the AAA server 22. Those of ordinary skill in the art will realize that other internet protocols can be used as acceptable communication means between the various communication devices which encompass the computer network 10.

At step 30 of FIG. 2A, the user of the host computer 12 initiates a dashboard application program as a means of gaining access to a desired computer network. The dashboard application program will typically require the user to enter some form of user identification and authentication information, most generally, a user-name and a private password. It may be possible for the host computer to store such information in memory and provide this information to the application program automatically upon initiating the program. The application program will then contact a computer network service provider, typically a telephone company (Telco) or commercial internet service provider (ISP), via a modem and telephone line. At step 32, the host 12 sends to the computer network service provider a RADIUS logon request data packet containing the user identification and authentication information. This data packet can come directly from the host computer 12 or, it is also within the inventive concept herein disclosed, to have this packet sent from an external web server.

At step 34, the computer network service provider receives the RADIUS logon request data packet at the SSG 20 and initiates a RADIUS account logon access request packet for host authentication. At step 36, the RADIUS account logon access request packet is directed to the AAA server 22 where, at step 38, the access request packet is matched against unique user profiles in memory to verify the authenticity of the user host 12. Next, at step 40 the AAA server 22 sends an authentication reply back to the SSG 20 which confirms the authentication and lists the services available for a particular user. If the authentication reply indicates that the authentication process was successful then, at step 42, the SSG 20 logons on the host 12 by sending an access-accept packet from the SSG 20 to the host 12 informing the user that the logon process has been completed and displaying the available services on the user's dashboard. If the authentication reply indicates that the authentication process was unsuccessful then, at step 44, the SSG 20 sends a prompt back to the host 12 noting the user that the authentication process was unsuccessful.

Once the SSG 20 logons on the host 12, at step 46 the SSG 20 generates an account logon accounting start request and, at step 48, this accounting start request is sent to the AAA server 22. In the preferred embodiment the RADIUS account logon accounting start request will have the following attributes associated with the record:

Acct-Status-Type=Start
NAS-IP-Address=ip_address
User-Name="username"
Acct-Session-Id="session_id"
Framed-IP-Address=user_ip
Proxy-State="n"

where:
ip_address=IP address of the SSG interface card 1.
username=Name used to log on to the service provider network session_id=Session Number
user_ip=IP address of the user's system
n=Accounting record queuing information Once the account logon accounting start request has been completed, at step 50, the host 12 is capable of initiating a service logon request. At step 52, the service logon request is sent from the host 12 to the computer network service provider where it is received by the SSG 20. The SSG 20 makes an initial determination, at step 54, to determine if the requested service is available within the SSG 20. If the user profile pre-exists in the SSG 20 then a determination is made, at step 64, as to whether the user has authorization to access the desired service. If no user profile exists, then at step 56, the SSG 20 prepares a RADIUS service access request packet as a means for verifying the authorized services available for the given user. The RADIUS service access request packet is sent, at step 58, to the AAA server 22 where the information in the service access request packet is used to locate, at step 60, user profile stored in the memory of the AAA server 22. Once the user profile is found, it is forwarded to the SSG 20 at step 62 and at step 64 a determination is made as to whether the user has authorization to access the desired service. If no match to the desired service is found within the user profile then authorization to access the service is withheld and, at step 66, a prompt is sent to the host 12 informing the user that service authorization is denied. If the service to which the user 12 desires access to is found within the user profile then the SSG 20 at step 68, logs the user on to the desired service. The connection to the service may be accomplished by various means, including but not limited to, an L2TP (Layer Two Tunneling Protocol) tunnel connection 24 or a standard Internet (packet-forward) connection 26 via a leased line.

Once the service logon is successfully completed, at step 70, the SSG 20 determines whether a pre-existing service connection exists (typically, generated by any other host which connects through this particular access point). If a service connection is pre-existing then no need exists to generate a service accounting start request packet because the AAA server 22 will already have such stored in memory. If no pre-existing service connection exists, then at step 72, the SSG 20 generates a service accounting start request packet and at step 74 this request is sent from the SSG 20 to the AAA server 22. In the preferred embodiment the RADIUS service accounting start request packet will have the following attributes associated with the record:
Acct-Status-Type=Start
NAS-IP-Address=ip_address
User-Name="service"
Acct-Session-Id="session_id"
Proxy-State="n"

where:
service=Name of the service profile.
ip_address=IP address of the SSG interface card 1.
session_id=Session Number.
n=Accounting record queuing information.

Once the service establishment is completed, the user, at step 76, is connected with the home gateway 28 of the desired service. When this type of Point to Point Protocol (PPP) connection is made with the home gateway 78 of the desired service, it triggers the SSG 20, at step 80, to generate a connection accounting request packet and forward this request to the AAA server 22, step 80. In the preferred embodiment the RADIUS connection accounting start request packet will have the following attributes associated with the record:

Acct-Status-Type=Start
NAS-IP-Address=ip_address
User-Name="username"
Acct-Authentic=RADIUS
Acct-Session-Id="session_id"
Service-Info="service"
Service-Info="hg_username"
Service-Info="type"
Proxy-State="n"

where:
ip_address=IP address of the SSG interface card 1.
username=Name used to log on to the service provider network
session_id=Session Number
service=Name of the service profile.
hg_username=The username used to authenticate the user with the home gateway.
type=TT—Tunneled connection.
  TI—Internet (packet-forward) connection.
n=Accounting record queuing information.

Once a user desires to disconnect from an open PPP connection and, at step 82, the disconnect is executed, the SSG 20 generates a connection accounting stop request packet, step 84. While these packets will typically be generated due to a host-request disconnect command, it is also possible to generate the packets when a disconnect is prompted by other events outside the control of the user, such as, a lost-carrier, a lost-service or a session-timeout. Once the connection account stop request packet is generated, at step 86, the packet is forwarded to the AAA server 22 where it is coupled with the initial connection start request for accounting and filing purposes. In the preferred embodiment the RADIUS connection accounting stop request packet will have the following attributes associated with the record:
Acct-Status-Type=Stop
NAS-IP-Address=ip_address
User-Name="username"
Acct-Input-Octets=in-bytes
Acct-Output-Octets=out_bytes
Acct-Session-Time=time
Acct-Terminate-Cause=cause
Acct-Session-Id="session_id"
Service-Info="service"
Service-Info="hg_username"
Service-Info="type"
Proxy-State="n"

where:
ip_address=IP address of the SSG interface card 1.
username=Name used to log on to the service provider network.
in_bytes=Number of inbound bytes.
out_bytes=Number of outbound bytes.
time=Length of session in seconds.
cause=Cause of account termination. These include:
  -Lost-Carrier -Lost-Service -User-Request -Session-Timeout
session_id=Session Number.
service=Name of the service profile.
hg_username=The username used to authenticate the user with the home gateway.
type=TT—Tunneled connection.
  TI—Internet (packet-forward) connection.
n=Accounting record queuing information.

Once the host terminates the PPP connection, at step 88, the SSG 20 determines whether any remaining connections exist to the service. If the host 12 or other hosts connected through this access point have current connections existing with this service, then no need exists at this time to generate a service accounting stop request packet The service accounting stop request packet will be generated only when no existing connections exist through the service connection. If the SSG 20 determines that no other then-existing connections exist through the service connection then, at step 90, the SSG 20 generates a service accounting stop request packet. While these service stop request packets will typically be generated as a result of a host-request disconnect command, it is also possible to generate the packets when a disconnect is prompted by other events outside the control of the user, such as, a lost-carrier, a lost-service or a session-timeout. Once the service account stop request packet is generated, at step 92, the packet is forwarded to the AAA server 22 where it is coupled with the initial service start request for accounting and filing purposes. In the preferred embodiment the RADIUS service accounting stop request packet will have the following attributes associated with the record:

Acct-Status-Type=Stop
NAS-IP-Address=ip_address
User-Name="service"
Acct-Input-Octets=in-bytes
Acct-Output-Octets =out_bytes
Acct-Session-Time=time
Acct-Terminate-Cause=cause
Acct-Session-Id="session_id"
Proxy-State="n"

where:
service=Name of the service profile.
ip_address=IP address of the SSG interface card 1.
in_bytes=Number of inbound bytes.
out_bytes Number of outbound bytes.
time=Length of session in seconds.
cause=Cause of account termination. These include:
 -Lost-Carrier -Lost-Service -Host-Request -Session-Timeout
session_id=Session Number.
n=Accounting record queuing information.

Finally, once the host desires to logoff from the network account and, at step 94, the logoff is executed, the SSG 20 generates an account logoff accounting stop request packet, step 96. While these packets will typically be generated due to a user-requested logoff command, it is also possible to generate the stop packets when a logoff is prompted by other events outside the control of the user, such as a session timeout. Once the account logoff accounting stop request packet is generated, at step 98, the packet is forwarded to the AAA server 22 where it is coupled with the initial account logon accounting start request for further accounting and filing purposes. In the preferred embodiment the RADIUS account logoff accounting stop request packet will have the following attributes associated with the record:

Acct-Status-Type=Stop
NAS-IP-Address=ip_address
User-Name="username"
Acct-Session-Time=time
Acct-Terminate-Cause=cause
Acct-Session-Id="session_id"
Framed-IP-Address=user_ip
Proxy-State="n"

where:
ip_address=IP address of the SSG interface card 1.
username=Name used to log on to the service provider network.
time=Length of session in seconds.
cause=Cause of account termination. These include:
 -User-Request -Session-Timeout
session_id=Session Number.
user_ip=IP address of the user's system.
n=Accounting record queuing information.

In another preferred embodiment of the present invention the method for multiple-level accounting can include an additional accounting session implemented to provide periodic update information to the AAA server 22. These periodic accounting update request packets contain information which, typically, mirrors the data found in account logoff accounting stop request packets and serve as an added measure of security should system errors, transmission errors, or the like, prevent the actual account logoff accounting stop request from being either properly generated at the SSG 20 or properly sent to the AAA server 22. The Telco or commercial ISP is capable of defining the attributes associated with the periodic accounting update request and defining the time period between such requests.

Additional security measures can also be imposed by the SSG 20 to insure that accounting request packets are properly received by the AAA server 22. These security measures include defining within the SSG 20 scheme a retry value and an interval between retry to be employed when the SSG 20 makes a determination that an accounting request packet was not properly delivered to the AAA 22 server. The retry value and the interval between retry are SSG-user configurable.

Figure 3:
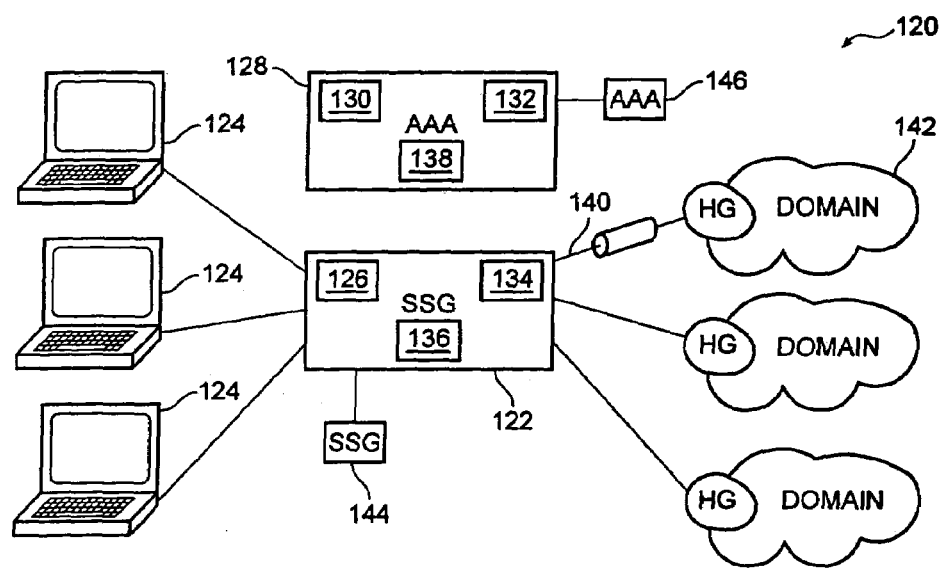
FIG. 3 is a schematic of an accounting system within a computer network which employs multiple-level Internet protocol accounting in accordance with a presently preferred embodiment of the present invention.

In another embodiment of the present invention, a networking event metering system using the multiple level accounting of the present invention is detailed in FIG. 3. In this configuration the networking event metering system 120 includes a gateway device 122. The gateway device 122 is in communication with a plurality of hosts 124, typically by means of a telephone line. Those of ordinary skill in the art will recognize that other types of host-to-gateway device access methods may be provided by a Telcos or ISP such as frame relay, leased lines, ATM (Asynchronous Transfer Mode), ADSL (Asymmetric Digital Subscriber Line) and the like. The gateway device 122 has the capability to process access requests being sent from the hosts. These access requests would include, but not be limited to, account logon requests, service authorization requests and connection requests. In a preferred embodiment, the gateway device implements the RADIUS protocol as the communication language between itself and other ISP network interfaces. The gateway device 122 receives the account logon access requests from the hosts 124 and the proxier 126 within the gateway device 122 correspondingly proxies these access requests to AAA server 128 for user authentication purposes.

The AAA server 128 then compares attribute data found in the account logon access request packets against data found in the user profiles 130 of the AAA server's memory bank. If the data in the RADIUS access requests are found to match data in the AAA server 128 then access to the network can be granted. Additionally, the AAA server 128 holds service profiles 132 within the memory bank. The user profiles 130 contain, among various data attributes, a listing of which services (private and public domains) a specified user is authorized to access. The service profiles 132, which are not user dependant, contain attribute data for a specific service domain. The gateway device 122 can query the AAA server 128 for a given user profile 130 and then within the processor 134 of the gateway device 122 assess the profile to determine which services the user has authorization to access.

The gateway device 122 also encompasses an accounting request generator 136 which is capable of generating the accounting start and stop requests for various events which are triggered within the gateway device 122. Upon the gateway device 122 authenticating the user for account logon, the accounting request generator 136 will issue an account logon accounting start request packet and forward the packet to the accounter 138 located within the AAA server 128. Similarly, upon the gateway device 122 authorizing the user to access a specific service, the accounting request generator 136 will, typically, issue a service accounting start request and forward the packet to the accounter 138 located within the AAA server 128. In the instance where the service already has a then-existing connection established by the host or any other host connecting through the gateway device 122, no need would exist to generate the service start request because such a request will already be existing within the accounter 138. Once the user establishes a PPP connection 140 to the desired service 142, the accounting request generator 136 will issue a PPP connection accounting start request and forward the packet to the accounter 138 located within the AAA server 128.

The gateway device 122 will also rely on the accounting request generator 136 to issue the accounting stop requests upon certain triggering events occurring. When the user disconnects from a PPP connection, the accounting request generator 136 will issue a PPP connection accounting stop request packet and forward this packet to the accounter 138 where it will be married with its corresponding start request for accounting purposes. While these packets will typically be generated due to a host-request disconnect command, it is also possible to generate the packets when a disconnect is prompted by other events outside the control of the user, such as, a lost-carrier, a lost-service or a session-timeout. When the user disconnects from a PPP connection the processor 134 within the gateway device 122 will determine if any additional connections remain to that particular service through that particular tunnel or routed connection. If no additional connections remain, then the accounting request generator 136 will issue a service accounting stop request packet and forward this packet to the accounter 138 where it will be married with the corresponding stop request for subsequent accounting purposes. While these service stop request packets will typically be generated as a result of a host-request disconnect command, it is also possible to generate the packets when a disconnect is prompted by other events outside the control of the user, such as, a lost-carrier, a lost-service or a session-timeout. Finally, when the host initiates an account logoff, the accounting request generator 136 will issue an account logoff accounting stop request packet and forward this to the accounter 138 where it will be married with the corresponding stop request for subsequent accounting purposes. While these packets will typically be generated due to a user-requested logoff command, it is also possible to generate the stop packets when a logoff is prompted by other events outside the control of the user, such as a session timeout.

Additionally, it is within the inventive concept herein disclosed to provide back-up capacity to both the gateway device 122 and AAA server 128 to compensate for device failures or errors in transmission. A back-up gateway device 144 allows for a safeguard should the primary gateway device 122 become temporarily inactive and fail to provide a means for generating and sending accounting start or stop requests a secondary AAA server 146 allows for the initial accounting start request data to be catalogued in a second location should the primary AAA server encounter a temporary failure or service outage.

Figure 4:
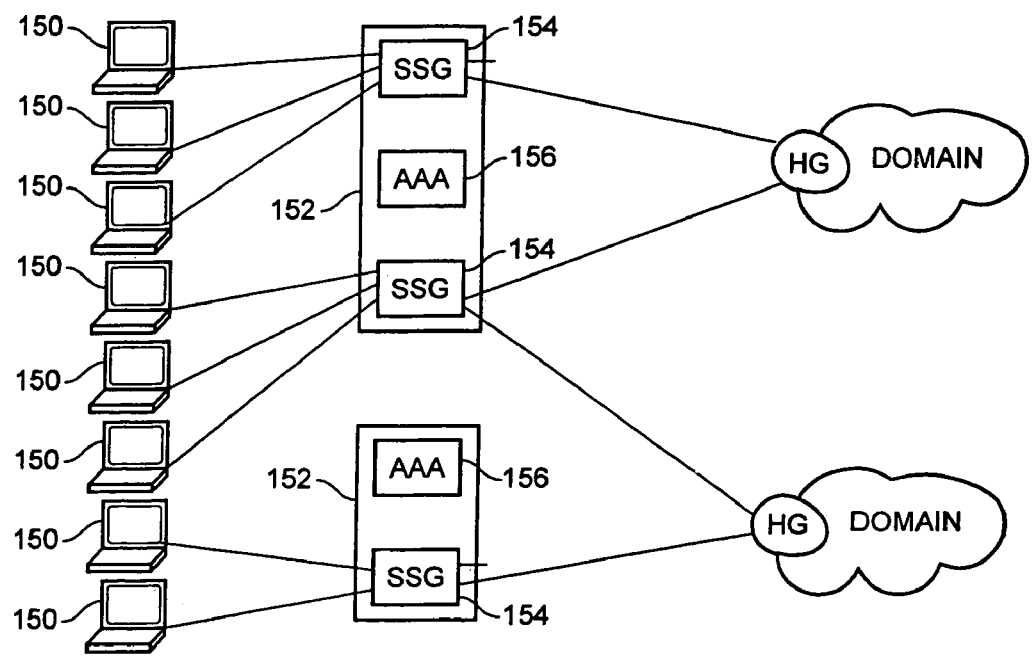
FIG. 4 is a schematic of a computer network system which employs multiple-level Internet protocol accounting in accordance with a presently preferred embodiment of the present invention.

In another preferred embodiment of the present invention, a computer network having the capabilities to use multiple-level accounting is illustrated in FIG. 4. A plurality of hosts 150 have the capacity to gain network access through network access points 152. The access point is typically operated by a Telco or ISP and houses various network interfaces and service components. Included among these components are a plurality of gateway devices 154 and AAA servers 156. The AAA servers 156 may accommodate several client SSG's simultaneously and communicate with one another according to a standard Internet protocol, such as RADIUS. The gateway devices 154 are in communication with a plurality of hosts 150, typically by means of a telephone line. Those of ordinary skill in the art will recognize that other types of host-to-gateway device access methods may be provided by a Telcos or ISP such as frame relay, leased lines, ATM (Asynchronous Transfer Mode), ADSL (Asymmetric Digital Subscriber Line) and the like. The gateway devices 154 are capable of receiving account logon and service requests from the hosts 150, proxying these requests to the AAA servers 156 for authentication and authorization and then determining account logon and service. Once these determinations are made the gateway devices generates accounting start requests based on account logon, service establishment and PPP connection start. When the host initiates a termination request or when other events outside the control of the user dictate such, the gateway device generates accounting stop requests based on account logoff, service disconnect and PPP connection stop.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. An accounting metering apparatus for providing accounting in a computer network, said apparatus comprising:
  a service accounting start request receiver adapted to receive a service accounting start request for a particular service, the service accounting start request being generated in response to a user's logging onto the service if no other users have a current connection established to the service; and
  a service accounting stop request receiver adapted to receive a service accounting stop request for the service, the service accounting stop request being generated in response to disconnection of the user from the service if no other users on the computer network have a current connection established to the service.

2. The accounting metering apparatus of claim 1, further comprising:
  a logon access request receiver adapted to receive a logon access request for a user attempting to logon to the computer network; and
  an authentication reply sender adapted to send an authentication reply for the user after verifying the user's logon access request against user profiles.

3. The accounting metering apparatus of claim 1, further comprising:
an account logon accounting start request receiver adapted to receive an account logon accounting start request when a user has logged on to the computer network; and
an account logoff accounting stop request receiver adapted to receive an account logoff accounting stop request when the user has logged off from the computer network.

4. The accounting metering apparatus of claim 1, further comprising:
a service access request receiver adapted to receive a service access request for a user; and
a user profile forwarder adapted to forward a user profile for the user in response to the service access request, the user profile containing information of services which the user is authorized to access.

5. The accounting metering apparatus of claim 1, further comprising:
a connection accounting start request receiver adapted to receive a connection accounting start request for a user when the user has established a connection to a desired service; and
a connection accounting stop request receiver adapted to receive a connection accounting stop request for the user when the user has disconnected form the service.

6. The accounting metering apparatus of claim 1, further comprising:
a memory adapted to maintain user profiles containing information of services authorized to respective users.

7. The accounting metering apparatus of claim 1, further comprising:
a memory adapted to maintain service profiles.

8. A method for providing accounting to a computer network, said method comprising:
receiving a service accounting start request for a particular service, the service accounting start request being generated in response to a user's logging onto the service if no other users have a current connection established to the service; and
receiving a service accounting stop request for the service, the service accounting stop request being generated in response to disconnection of the user from the service if no other users on the computer network have a current connection established to the service.

9. The method of claim 8, further comprising:
receiving a logon access request for a user attempting to logon to the computer network;
verifying the user's logon access request against user profiles; and
sending an authentication reply for the user, the authentication reply indicating a result of said verifying.

10. The method of claim 8, further comprising:
receiving an account logon accounting start request when a user has logged on to the computer network; and
receiving an account logoff accounting stop request when the user has logged off from the computer network.

11. The method of claim 8, further comprising:
receiving a service access request for a user; and
forwarding a user profile for the user in response to the service access request, the user profile containing information of services which the user is authorized to access.

12. The method of claim 8, further comprising:
receiving a connection accounting start request for a user when the user has established a connection to a desired service; and
receiving a connection accounting stop request for the user when the user has disconnected form the service.

13. An apparatus for providing accounting to a computer network, said apparatus comprising:
means for receiving a service accounting start request for a particular service, the service accounting start request being generated in response to a user's logging onto the service if no other users have a current connection established to the service; and
means for receiving a service accounting stop request for the service, the service accounting stop request being generated in response to disconnection of the user from the service if no other users on the computer network have a current connection established to the service.

14. The apparatus of claim 13, further comprising:
means for receiving a logon access request for a user attempting to logon to the computer network;
means for verifying the user's logon access request against user profiles; and
means for sending an authentication reply for the user, the authentication reply indicating a result of said verifying.

15. The apparatus of claim 13, further comprising:
means for receiving an account logon accounting start request when a user has logged on to the computer network; and
means for receiving an account logoff accounting stop request when the user has logged off from the computer network.

16. The apparatus of claim 13, further comprising:
means for receiving a service access request for a user; and
means for forwarding a user profile for the user in response to the service access request, the user profile containing information of services which the user is authorized to access.

17. The apparatus of claim 13, further comprising:
means for receiving a connection accounting start request for a user when the user has established a connection to a desired service; and
means for receiving a connection accounting stop request for the user when the user has disconnected form the service.

18. The apparatus of claim 13, further comprising:
means for maintaining user profiles containing information of services authorized to respective users.

19. The apparatus of claim 13, further comprising:
means for maintaining service profiles.

20. A program storage device readable by a machine, storing instructions executable by the machine to perform a method for providing accounting to a computer network, said method comprising:
receiving a service accounting start request for a particular service, the service accounting start request being generated in response to a user's logging onto the service if no other users have a current connection established to the service; and
receiving a service accounting stop request for the service, the service accounting stop request being generated in response to disconnection of the user from the service if no other users on the computer network have a current connection established to the service.

21. The program storage device of claim 20, wherein said method further comprises:
  receiving a logon access request for a user attempting to logon to the computer network;
  verifying the user's logon access request against user profiles; and
  sending an authentication reply for the user, the authentication reply indicating a result of said verifying.

22. The program storage device of claim 20, wherein said method further comprises:
  receiving an account logon accounting start request when a user has logged on to the computer network; and
  receiving an account logoff accounting stop request when the user has logged off from the computer network.

23. The program storage device of claim 20, wherein said method further comprises:
  receiving a service access request for a user; and
  forwarding a user profile for the user in response to the service access request, the user profile containing information of services which the user is authorized to access.

24. The program storage device of claim 20, wherein said method further comprises:
  receiving a connection accounting start request for a user when the user has established a connection to a desired service; and
  receiving a connection accounting stop request for the user when the user has disconnected form the service.

25. A system for providing accounting within a computer network, said method comprising:
  a gateway device including:
    a service accounting start request generator adapted to generate a service accounting start request associated with a service requested by a subscriber in response to a determination that the subscriber has logged on to the requested service and that no other subscribers have a current connection established to the requested service; and
    a service accounting stop request generator adapted to generate a service accounting stop request associated with the requested service in response to a determination that the subscriber has terminated the requested service and that no other subscribers have a current connection established to the requested service; and
  an accounting server communicating with said gateway device, said accounting server including:
    an accounter adapted to receive the service accounting start request and the service accounting stop request.

26. The system of claim 25, wherein said gateway device further comprises:
  a logon access request generator adapted to generate a logon access request for a subscriber attempting to logon to the computer network,
  and wherein said accounting server further comprises:
  an authenticator adapted to verify the subscriber's logon access request against subscriber profiles; and
  an authentication reply sender adapted to send an authentication reply for the subscriber.

27. The system of claim 25, wherein said gateway device further comprises:
  an account logon accounting start request generator adapted to generate an account logon accounting start request when a subscriber has logged on to the computer network; and
  an account logoff accounting stop request generator adapted to generate an account logoff accounting stop request when the subscriber has logged off from the computer network,
  and wherein said accounter is further adapted to receive the account logon accounting start request and the account logoff accounting stop request.

28. The system of claim 25, wherein said gateway device further comprises:
  a service access request generator adapted to generate a service access request for a subscriber, and
  wherein said accounting server further comprises:
  a user profile forwarder adapted to forward a user profile for the subscriber in response to receiving the service access request.

29. The system of claim 25, wherein said gateway device further comprises:
  a connection accounting start request generator adapted to generate a connection accounting start request for a subscriber when the subscriber has established a connection to a desired service; and
  a connection accounting stop request generator adapted to generate a connection accounting stop request for the subscriber when the subscriber has disconnected form the service,
  and wherein said accounter is further adapted to receive the connection accounting start request and the connection accounting stop request.

30. The system of claim 25, wherein said accounting server further comprises:
  a memory adapted to maintain user profiles containing information of services authorized to respective subscribers.

31. The system of claim 25, wherein said accounting server further comprises:
  a memory adapted to maintain service profiles.

32. The system of claim 25, wherein said gateway device and said accounting server communicate using an internet protocol.

33. The system of claim 32, wherein said gateway device and said accounting server communicate using a RADIUS protocol.

34. The system of claim 25, further comprising:
  a secondary gateway device to backup said gateway device if said gateway device becomes unavailable.

35. The system of claim 25, further comprising:
  a secondary accounting server to backup said accounting server device if said accounting server becomes unavailable.

36. A method for providing accounting within a computer network, said method comprising:
  generating, at a gateway device, a service accounting start request associated with a service requested by a subscriber in response to a determination that the subscriber has logged on to the requested service and that no other subscribers have a current connection established to the requested service;
  forwarding the service accounting start request to an accounting server;
  generating, at the gateway device, a service accounting stop request associated with the requested service in response to a determination that the subscriber has terminated the requested service and that no other subscribers have a current connection established to the requested service; and
  forwarding the service accounting stop request to the accounting server.

37. The method of claim 36, further comprising:
generating, at the gateway device, a logon access request for a subscriber attempting to logon to the computer network;
receiving, at the accounting server, the logon access request and verifying the subscriber's logon access request against subscriber profiles; and
sending an authentication reply for the subscriber to the gateway device.

38. The method of claim 36, further comprising:
generating, at the gateway device, an account logon accounting start request when a subscriber has logged on to the computer network;
forwarding the account logon accounting start request to the accounting server;
generating, at the gateway device, an account logoff accounting stop request when the subscriber has logged off from the computer network; and
forwarding the account logoff accounting stop request to the accounting server.

39. The method of claim 36, further comprising:
generating, at the gateway device, a service access request for a subscriber; and
receiving, at the accounting server, the service access request and forwarding a user profile for the subscriber to the gateway device.

40. The method of claim 36, further comprising:
generating, at the gateway device, a connection accounting start request for a subscriber when the subscriber has established a connection to a desired service;
forwarding the connection accounting start request to the accounting server;
generating, at the gateway device, a connection accounting stop request for the subscriber when the subscriber has disconnected form the service; and
forwarding the connection accounting stop request to the accounting server.

41. The method of claim 36, further comprising:
maintaining, at the accounting server, user profiles containing information of services authorized to respective subscribers.

42. The method of claim 36, further comprising:
maintaining service profiles at the accounting server.

43. The method of claim 36, wherein the gateway device and the accounting server communicate using an internet protocol.

44. The method of claim 43, wherein the gateway device and the accounting server communicate using a RADIUS protocol.

45. The method of claim 36, further comprising:
providing a secondary gateway device to backup the gateway device if the gateway device becomes unavailable.

46. The method of claim 36, further comprising:
providing a secondary accounting server to backup the accounting server device if the accounting server becomes unavailable.

47. A system for providing accounting within a computer network, said system comprising:
means for generating, at a gateway device, a service accounting start request associated with a service requested by a subscriber in response to a determination that the subscriber has logged on to the requested service and that no other subscribers have a current connection established to the requested service;
means for forwarding the service accounting start request to an accounting server;
means for generating, at the gateway device, a service accounting stop request associated with the requested service in response to a determination that the subscriber has terminated the requested service and that no other subscribers have a current connection established to the requested service; and
means for forwarding the service accounting stop request to the accounting server.

48. The system of claim 47, further comprising:
means for generating, at the gateway device, a logon access request for a subscriber attempting to logon to the computer network;
means for receiving, at the accounting server, the logon access request and verifying the subscriber's logon access request against subscriber profiles; and
means for sending an authentication reply for the subscriber to the gateway device.

49. The system of claim 47, further comprising:
means for generating, at the gateway device, an account logon accounting start request when a subscriber has logged on to the computer network;
means for forwarding the account logon accounting start request to the accounting server;
means for generating, at the gateway device, an account logoff accounting stop request when the subscriber has logged off from the computer network; and
means for forwarding the account logoff accounting stop request to the accounting server.

50. The system of claim 47, further comprising:
means for generating, at the gateway device, a service access request for a subscriber; and
means for receiving, at the accounting server, the service access request and forwarding a user profile for the subscriber to the gateway device.

51. The system of claim 47, further comprising:
means for generating, at the gateway device, a connection accounting start request for a subscriber when the subscriber has established a connection to a desired service;
means for forwarding the connection accounting start request to the accounting server;
means for generating, at the gateway device, a connection accounting stop request for the subscriber when the subscriber has disconnected form the service; and
means for forwarding the connection accounting stop request to the accounting server.

52. The system of claim 47, further comprising:
means for maintaining, at the accounting server, user profiles containing information of services authorized to respective subscribers.

53. The system of claim 47, further comprising:
means for maintaining service profiles at the accounting server.

54. The system of claim 47, wherein the gateway device and the accounting server communicate using an internet protocol.

55. The system of claim 54, wherein the gateway device and the accounting server communicate using a RADIUS protocol.

56. A program storage device readable by a machine, storing instructions executable by the machine to perform a method for providing accounting within a computer network, said method comprising:
generating, at a gateway device, a service accounting start request associated with a service requested by a subscriber in response to a determination that the subscriber has logged on to the requested service and that no other subscribers have a current connection established to the requested service;

forwarding the service accounting start request to an accounting server;

generating, at the gateway device, a service accounting stop request associated with the requested service in response to a determination that the subscriber has terminated the requested service and that no other subscribers have a current connection established to the requested service; and forwarding the service accounting stop request to the accounting server.

57. The program storage device of claim 56, wherein said method further comprises:

generating, at the gateway device, a logon access request for a subscriber attempting to logon to the computer network;

receiving, at the accounting server, the logon access request and verifying the subscriber's logon access request against subscriber profiles; and sending an authentication reply for the subscriber to the gateway device.

58. The program storage device of claim 56, wherein said method further comprises:

generating, at the gateway device, an account logon accounting start request when a subscriber has logged on to the computer network;

forwarding the account logon accounting start request to the accounting server;

generating, at the gateway device, an account logoff accounting stop request when the subscriber has logged off from the computer network; and forwarding the account logoff accounting stop request to the accounting server.

59. The program storage device of claim 56, wherein said method further comprises:

generating, at the gateway device, a service access request for a subscriber; and receiving, at the accounting server, the service access request and forwarding a user profile for the subscriber to the gateway device.

60. The program storage device of claim 56, wherein said method further comprises:

generating, at the gateway device, a connection accounting start request for a subscriber when the subscriber has established a connection to a desired service;

forwarding the connection accounting start request to the accounting server;

generating, at the gateway device, a connection accounting stop request for the subscriber when the subscriber has disconnected form the service; and forwarding the connection accounting stop request to the accounting server.

61. The program storage device of claim 56, wherein said method further comprises:

maintaining, at the accounting server, user profiles containing information of services authorized to respective subscribers.

62. The program storage device of claim 56, wherein said method further comprises:

maintaining service profiles at the accounting server.

63. The program storage device of claim 56, wherein the gateway device and the accounting server communicate using an internet protocol.

64. The program storage device of claim 63, wherein the gateway device and the accounting server communicate using a RADIUS protocol.

65. A method for providing accounting within a computer network, said method comprising:

receiving a service logon request from a subscriber, the service logon request indicating a requested service;

logging on the subscriber to the requested service if the requested service is available for the subscriber;

generating a service accounting start request associated with the requested service in response to a determination that the subscriber has logged on to the requested service and that no other subscribers have a current connection established to the requested service; and generating a service accounting stop request associated with the requested service in response to a determination that the subscriber has terminated the requested service and that no other subscribers have a current connection established to the requested service.

66. The method of claim 65, wherein said logging on the subscriber comprises:

determining if the user has authorization to access the requested service based on a user profile for the subscriber.

67. The method of claim 66, wherein said logging on the subscriber further comprises:

generating, if a user profile is not available, a service access request to locate a user profile for the subscriber stored in a memory; and receiving the user profile from the memory.

68. The method of claim 67, wherein the memory is maintained in an accounting server.

69. An apparatus for providing accounting within a computer network, said apparatus comprising:

a proxier adapted to receive a service logon request from a subscriber, the service logon request indicating a requested service, the subscriber logging on to the requested service if the requested service is available for the subscriber;

a service accounting start request generator adapted to generate a service accounting start request associated with the requested service in response to a determination that the subscriber has logged on to the requested service and that no other subscribers have a current connection established to the requested service; and a service accounting stop request generator adapted to generate a service accounting stop request associated with the requested service in response to a determination that the subscriber has terminated the requested service and that no other subscribers have a current connection established to the requested service.

70. The apparatus of claim 69, further comprising:

a processor adapted to determine if the user has authorization to access the requested service based on a user profile for the subscriber.

71. The apparatus of claim 70, further comprising:

a service access request generator adapted to generate, if the user profile is not available, a service access request to locate a user profile for the subscriber stored in a memory.

72. The apparatus of claim 71, wherein the memory is maintained in an accounting server.

73. An apparatus for providing accounting within a computer network, said apparatus comprising:

means for receiving a service logon request from a subscriber, the service logon request indicating a requested service;

means for logging on the subscriber to the requested service if the requested service is available for the subscriber;

means for generating a service accounting start request associated with the requested service in response to a determination that the subscriber has logged on to the requested service and that no other subscribers have a current connection established to the requested service; and means for generating a service accounting stop request associated with the requested service in response to a determination that the subscriber has terminated the requested service and that no other subscribers have a current connection established to the requested service.

74. The apparatus of claim 73, further comprising:
means for determining if the user has authorization to access the requested service based on a user profile for the subscriber.

75. The apparatus of claim 74, further comprising:
means for generating, if a user profile is not available, a service access request to locate a user profile for the subscriber stored in a memory; and means for receiving the user profile from the memory.

76. The apparatus of claim 75, wherein the memory is maintained in an accounting server.

77. A program storage device readable by a machine, storing instructions executable by the machine to perform a method for providing accounting within a computer network, said method comprising:

receiving a service logon request from a subscriber, the service logon request indicating a requested service;

logging on the subscriber to the requested service if the requested service is available for the subscriber;

generating a service accounting start request associated with the requested service in response to a determination that the subscriber has logged on to the requested service and that no other subscribers have a current connection established to the requested service; and generating a service accounting stop request associated with the requested service in response to a determination that the subscriber has terminated the requested service and that no other subscribers have a current connection established to the requested service.

78. The program storage device of claim 77, wherein said logging on the subscriber comprises:

determining if the user has authorization to access the requested service based on a user profile for the subscriber.

79. The program storage device of claim 78, wherein said logging on the subscriber further comprises:

generating, if a user profile is not available, a service access request to locate a user profile for the subscriber stored in a memory; and receiving the user profile from the memory.

* * * * *